US010847788B2

(12) United States Patent
Yuge et al.

(10) Patent No.: US 10,847,788 B2
(45) Date of Patent: Nov. 24, 2020

(54) LITHIUM-IRON-MANGANESE-BASED COMPOSITE OXIDE AND LITHIUM-ION SECONDARY BATTERY USING SAME

(71) Applicants: NEC Corporation, Tokyo (JP); Tanaka Chemical Corporation, Fukui (JP)

(72) Inventors: Ryota Yuge, Tokyo (JP); Noriyuki Tamura, Tokyo (JP); Sadanori Hattori, Tokyo (JP); Mitsuharu Tabuchi, Osaka (JP); Kentaro Kuratani, Osaka (JP); Kyousuke Doumae, Fukui (JP); Hideka Shibuya, Fukui (JP)

(73) Assignees: NEC Corporation, Tokyo (JP); Tanaka Chemical Corporation, Fukui (JP)

( * ) Notice: Subject to any disclaimer, the term of this patent is extended or adjusted under 35 U.S.C. 154(b) by 188 days.

(21) Appl. No.: 15/551,853

(22) PCT Filed: Feb. 9, 2016

(86) PCT No.: PCT/JP2016/053775
§ 371 (c)(1),
(2) Date: Aug. 17, 2017

(87) PCT Pub. No.: WO2016/132963
PCT Pub. Date: Aug. 25, 2016

(65) Prior Publication Data
US 2018/0069236 A1  Mar. 8, 2018

(30) Foreign Application Priority Data

Feb. 20, 2015  (JP) ................................ 2015-031704

(51) Int. Cl.
| | |
|---|---|
| *H01M 4/36* | (2006.01) |
| *H01M 4/505* | (2010.01) |
| *H01M 4/525* | (2010.01) |
| *C01G 53/00* | (2006.01) |
| *C01F 17/206* | (2020.01) |
| *H01M 4/48* | (2010.01) |
| *H01M 10/0525* | (2010.01) |
| *H01M 4/02* | (2006.01) |

(52) U.S. Cl.
CPC ........... *H01M 4/366* (2013.01); *C01F 17/206* (2020.01); *C01G 53/44* (2013.01); *C01G 53/50* (2013.01); *H01M 4/483* (2013.01); *H01M 4/505* (2013.01); *H01M 4/525* (2013.01); *H01M 10/0525* (2013.01); *C01P 2002/70* (2013.01); *C01P 2004/03* (2013.01); *C01P 2004/84* (2013.01); *C01P 2006/40* (2013.01); *H01M 2004/027* (2013.01); *H01M 2004/028* (2013.01); *Y02T 10/7011* (2013.01)

(58) Field of Classification Search
CPC ...... H01M 4/366; H01M 4/505; H01M 4/525; H01M 4/483; H01M 10/0525; H01M 2004/028; H01M 2004/027; C01G 53/44; C01G 53/50
See application file for complete search history.

(56) References Cited

U.S. PATENT DOCUMENTS

| | | |
|---|---|---|
| 2007/0218360 A1 | 9/2007 | Tabuchi et al. |
| 2011/0076556 A1 | 3/2011 | Karthikeyan et al. |
| 2011/0111298 A1 | 5/2011 | Lopez et al. |
| 2015/0194671 A1 | 7/2015 | Nakahara et al. |

FOREIGN PATENT DOCUMENTS

| | | |
|---|---|---|
| EP | 1837937 A1 | 9/2007 |
| JP | H06-150928 A | 5/1994 |
| JP | 2003-500318 A | 1/2003 |
| JP | 2005-154256 A | 6/2005 |
| JP | 2008-063211 | 3/2008 |
| JP | 2010-212228 A | 9/2010 |
| JP | 2011-187190 A | 9/2011 |
| JP | 2013-511129 A | 3/2013 |
| WO | WO-2013/118661 A1 | 8/2013 |

OTHER PUBLICATIONS

International Search Report corresponding to PCT/JP2016/053775, 2 pages, dated Mar. 15, 2016.
Meng, $Pr_6O_{11}$-Coated High Capacity Layered $Li[Li_{0.17}Ni_{0.17}Co_{0.10}Mn_{0.56}]O_2$ as a Cathode Material for Lithium Ion Batteries; Journal of the Electrochemical Society, 2014, vol. 161 No. 10, A1564-1571.

*Primary Examiner* — Laura Weiner
(74) *Attorney, Agent, or Firm* — Wilmer Cutler Pickering Hale and Dorr LLP

(57) ABSTRACT

There is provided a lithium-iron-manganese-based composite oxide capable of providing a lithium-ion secondary battery which has a high capacity retention rate in charge/discharge cycles and in which the generation of a gas caused by charge/discharge cycles is suppressed. A lithium-iron-manganese-based composite oxide having a layered rock-salt structure, wherein at least a part of the surface of a lithium-iron-manganese-based composite oxide represented by the following formula is coated with an oxide of at least one metal selected from the group consisting of La, Pr, Nd, Sm and Eu:

$Li_xM^1_{(y-p)}Mn_pM^2_{(z-q)}Fe_qO_{(2-\delta)}$ wherein $1.05 \leq x \leq 1.32$, $0.33 \leq y \leq 0.63$, $0.06 \leq z \leq 0.50$, $0 < p \leq 0.63$, $0.06 \leq q \leq 0.50$, $0 \leq \delta \leq 0.80$, $y \geq p$, and $z \geq q$; $M^1$ is at least one element selected from Ti and Zr; and $M^2$ is at least one element selected from the group consisting of Co, Ni and Mn.

13 Claims, 1 Drawing Sheet

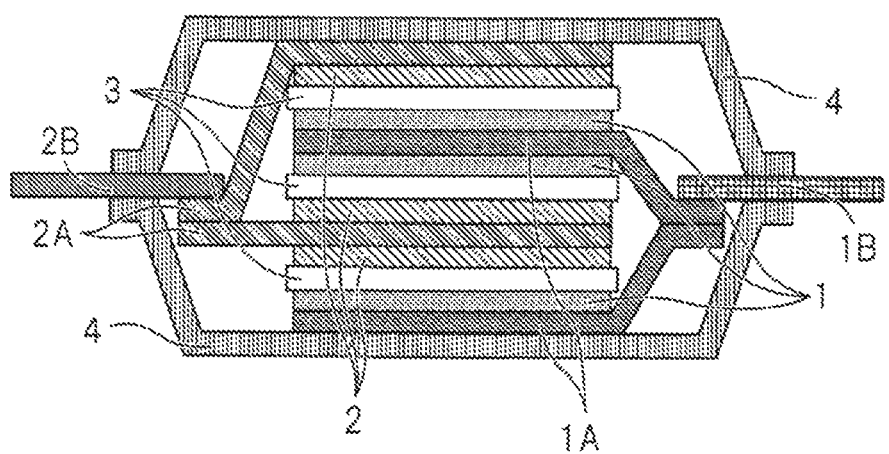

LITHIUM-IRON-MANGANESE-BASED COMPOSITE OXIDE AND LITHIUM-ION SECONDARY BATTERY USING SAME

CROSS-REFERENCE TO RELATED APPLICATIONS

This application is a national stage application of International Application No. PCT/JP2016/053775 entitled "LITHIUM-IRON-MANGANESE-BASED COMPOSITE OXIDE AND LITHIUM-ION SECONDARY BATTERY USING SAME," filed on Feb. 9, 2016, which claims the benefit of the priority of Japanese Patent Application No. 2015-031704 filed on Feb. 20, 2015, the disclosures of each of which are hereby incorporated by reference in their entirety.

TECHNICAL FIELD

Exemplary embodiments relate to a lithium-iron-manganese-based composite oxide and a lithium-ion secondary battery using the same.

BACKGROUND ART

A lithium-ion secondary battery including a positive electrode containing a lithium-iron-manganese-based composite oxide as a positive electrode active material and a negative electrode containing a material capable of intercalating/deintercalating lithium ions as a negative electrode active material is expected to be a secondary battery having a high energy density. For example, Patent Literature 1 discloses a lithium-ion secondary battery using a lithium-iron-manganese-based composite oxide for a positive electrode active material. On the other hand, Patent Literatures 2 to 6 each disclose a technique relating to a coating on a surface.

CITATION LIST

Patent Literature

Patent Literature 1: JP2005-154256A
Patent Literature 2: JP2011-187190A
Patent Literature 3: U.S. Patent Application No. 2011/0111298
Patent Literature 4: U.S. Patent Application No. 2011/0076556
Patent Literature 5: JP2003-500318A
Patent Literature 6: JP2013-511129A

SUMMARY OF INVENTION

Technical Problem

However, the lithium-ion secondary batteries disclosed in the Patent Literatures have the problem of the reduction of the capacity of the secondary battery as charge/discharge cycles are repeated.

It is an object of an exemplary embodiment to provide a lithium-iron-manganese-based composite oxide capable of providing a lithium-ion secondary battery which has a high capacity retention rate in charge/discharge cycles and in which the generation of a gas caused by charge/discharge cycles is suppressed.

Solution to Problem

A lithium-iron-manganese-based composite oxide according to an exemplary embodiment has a layered rock-salt structure, and at least a part of the surface of a lithium-iron-manganese-based composite oxide represented by the following formula (1) is coated with an oxide of at least one metal selected from the group consisting of La, Pr, Nd, Sm and Eu:

$$Li_xM^1_{(y-p)}Mn_pM^2_{(z-q)}Fe_qO_{(2-\delta)} \quad (1)$$

wherein $1.05 \leq x \leq 1.32$, $0.33 \leq y \leq 0.63$, $0.06 \leq z \leq 0.50$, $0 < p \leq 0.63$, $0.06 \leq q \leq 0.50$, $0 \leq \delta \leq 0.80$, $y \geq p$, and $z \geq q$; $M^1$ is at least one element selected from Ti and Zr; and $M^2$ is at least one element selected from the group consisting of Co, Ni and Mn.

A lithium-iron-manganese-based composite oxide according to an exemplary embodiment has a layered rock-salt structure, and at least a part of the surface of a lithium-iron-manganese-based composite oxide represented by the following formula (1) is coated with a composite oxide of at least one metal selected from the group consisting of La, Pr, Nd, Sm and Eu and at least one metal selected from the group consisting of Ge, Mo, Zr, Al and V:

$$Li_xM^1_{(y-p)}Mn_pM^2_{(z-q)}Fe_qO_{(2-\delta)} \quad (1)$$

wherein $1.05 \leq x \leq 1.32$, $0.33 \leq y \leq 0.63$, $0.06 \leq z \leq 0.50$, $0 < p \leq 0.63$, $0.06 \leq q \leq 0.50$, $0 \leq \delta \leq 0.80$, $y \geq p$, and $z \geq q$; $M^1$ is at least one element selected from Ti and Zr; and $M^2$ is at least one element selected from the group consisting of Co, Ni and Mn.

A positive electrode active material for a lithium-ion secondary battery according to an exemplary embodiment contains the lithium-iron-manganese-based composite oxide.

A positive electrode for a lithium-ion secondary battery according to an exemplary embodiment contains the positive electrode active material for a lithium-ion secondary battery.

A lithium-ion secondary battery according to an exemplary embodiment includes the positive electrode for a lithium-ion secondary battery and a negative electrode.

Advantageous Effects of Invention

An exemplary embodiment can provide a lithium-iron-manganese-based composite oxide capable of providing a lithium-ion secondary battery which has a high capacity retention rate in charge/discharge cycles and in which the generation of a gas caused by charge/discharge cycles is suppressed.

BRIEF DESCRIPTION OF DRAWING

FIG 1 is a cross-sectional view of an example of a lithium-ion secondary battery according to an exemplary embodiment.

DESCRIPTION OF EMBODIMENTS

[Lithium-iron-manganese-based Composite Oxide]

A lithium-iron-manganese-based composite oxide according to an exemplary embodiment has a layered rock-salt structure, and at least a part of the surface of a lithium-iron-manganese-based composite oxide represented by the following formula (1) is coated with an oxide of at least one metal selected from the group consisting of La, Pr, Nd, Sm and Eu:

$$Li_xM^1_{(y-p)}Mn_pM^2_{(z-q)}Fe_qO_{(2-\delta)} \quad (1)$$

wherein $1.05 \leq x \leq 1.32$, $0.33 \leq y \leq 0.63$, $0.06 \leq z \leq 0.50$, $0 < p \leq 0.63$, $0.06 \leq q \leq 0.50$, $0 \leq \delta \leq 0.80$, $y \geq p$, and $z \geq q$; $M^1$ is at least one element selected from Ti and Zr; and $M^2$ is at least one element selected from the group consisting of Co, Ni and Mn.

A lithium-iron-manganese-based composite oxide according to an exemplary embodiment has a layered rock-salt structure, and at least a part of the surface of a lithium-iron-manganese-based composite oxide represented by the formula (1) is coated with a composite oxide of at least one metal selected from the group consisting of La, Pr, Nd, Sm and Eu and at least one metal selected from the group consisting of Ge, Mo, Zr, Al and V.

A lithium-iron-manganese-based composite oxide having a layered rock-salt structure in which $Li_2Me^1O_3$ ($Me^1$ at least includes Mn) and $LiMe^2O_2$ ($Me^2$ at least includes Fe) are dissolved together in a solid solution is advantageous because when it is used as a positive electrode active material for a lithium-ion secondary battery (hereinafter, also referred to as positive electrode active material), a lithium-ion secondary battery (hereinafter, also referred to as secondary battery) can be provided which has a higher energy density than those of a lithium-nickel-manganese-based composite oxide and a lithium-cobalt-manganese-based composite oxide, in which the $Me^2$ at least includes Ni and Co, respectively, in place of Fe. However, the lithium-iron-manganese-based composite oxide is prone to detach oxygen in charge/discharge cycles after activation.

When oxygen is detached in charge/discharge cycles, the structure of the positive electrode active material changes from a layered rock-salt structure to a spinel structure, and as a result the capacity of the secondary battery is lowered. Further, $Li_2O$ is generated on the negative electrode due to the detached oxygen, which also lowers the capacity of the secondary battery. Furthermore, the secondary battery swells due to the detachment of oxygen to increase the resistance, and hence the capacity of the secondary battery is lowered.

The lithium-iron-manganese-based composite oxide (hereinafter, also referred to as composite oxide) according to an exemplary embodiment is a composite oxide having the specific composition represented by the formula (1) and at least a part of the surface thereof is coated with the specific oxide or composite oxide. Since at least a part of the surface of the lithium-iron-manganese-based composite oxide is coated with the specific oxide or composite oxide, the detachment of oxygen from the inside of the lithium-iron-manganese-based composite oxide can be physically suppressed in charge/discharge cycles. In addition, coating the surface of the lithium-iron-manganese-based composite oxide with the specific oxide or composite oxide enables the suppression of the generation of a gas caused by the reaction with the electrolytic solution. Therefore, in the case that the composite oxide according to an exemplary embodiment is used, the capacity of the secondary battery is retained even in charge/discharge cycles, which not only provides a high capacity retention rate but also suppresses the generation of a gas in charge/discharge cycles. Hereinafter, details of exemplary embodiments will be described.

The composite oxide represented by the formula (1) at least contains Mn. The composition p for Mn satisfies $0<p\leq0.63$. $0<p$ allows the composite oxide to contain an excessive amount of lithium. Further, $p\leq0.63$ allows the composite oxide to be in a state in which $Li_2Me^1O_3$ ($Me^1$ at least includes Mn) and $LiMe^2O_2$ ($Me^2$ at least includes Fe) are dissolved together in a solid solution. p preferably satisfies $0.10\leq p\leq0.60$, more preferably satisfies $0.20\leq p\leq0.55$, and still more preferably satisfies $0.30\leq p\leq0.50$.

In the formula (1), $M^1$ is at least one element of Ti and Zr. y in the composition y-p for $M^1$ satisfies $0.33\leq y\leq0.63$. $0.33\leq y$ allows the composite oxide to contain an excessive amount of lithium. Further, $y\leq0.63$ allows the composite oxide to be in a state in which $Li_2Me^1O_3$ ($Me^1$ at least includes Mn) and $LiMe^2O_2$ ($Me^2$ at least includes Fe) are dissolved together in a solid solution. y preferably satisfies $0.35\leq y\leq0.60$, more preferably satisfies $0.40\leq y\leq0.55$, and still more preferably satisfies $0.45\leq y\leq0.50$. It is to be noted that the formula (1) satisfies $y\geq p$. Optionally, the composition y-p for $M^1$ may be 0. That is, the composite oxide represented by the formula (1) may contain no $M^1$. Mn and $M^1$ in the formula (1) correspond to $Me^1$ in the $Li_2Me^1O_3$.

The composite oxide represented by the formula (1) at least contains Fe. The composition q for Fe satisfies $0.06\leq q\leq0.50$. $0.06\leq q$ allows the lithium-iron-manganese-based composite oxide to be activated. Further, $q\leq0.50$ allows the composite oxide to maintain the capacity high. q preferably satisfies $0.10\leq q\leq0.45$, more preferably satisfies $0.13\leq q\leq0.40$, and still more preferably satisfies $0.16\leq q\leq0.30$.

In the formula (1), $M^2$ is at least one element selected from the group consisting of Co, Ni and Mn. z in the composition z-q for $M^2$ satisfies $0.06\leq z\leq0.50$. $0.06\leq z$ allows the lithium-iron-manganese-based composite oxide to be activated. Further, $z\leq0.50$ allows the composite oxide to contain an excessive amount of lithium. z preferably satisfies $0.08\leq z\leq0.45$, more preferably satisfies $0.10\leq z\leq0.40$, and still more preferably satisfies $0.12\leq z\leq0.30$. It is to be noted that the formula (1) satisfies $z\geq q$. Optionally, the composition z-q for $M^2$ may be 0. That is, the composite oxide represented by the formula (1) may contain no $M^2$. Fe and $M^2$ in the formula (1) correspond to $Me^2$ in the $LiMe_2O_2$.

In the formula (1), the composition x for Li satisfies $1.05\leq x\leq1.32$. $1.05\leq x$ allows the composite oxide to have a high capacity. Further, $x\leq1.32$ allows the composite oxide to be in a state in which $Li_2Me^1O_3$ ($Me^1$ at least includes Mn) and $LiMe^2O_2$ ($Me^2$ at least includes Fe) are dissolved together in a solid solution. x preferably satisfies $1.08\leq x\leq1.30$, more preferably satisfies $1.12\leq x\leq1.28$, and still more preferably satisfies $1.16\leq x\leq1.26$.

In the formula (1), $\delta$ in the composition 2-$\delta$ for oxygen atoms, which is a parameter indicating oxygen defect, satisfies $0\leq\delta\leq0.80$. $0\leq\delta$ allows the composite oxide to have a high capacity. Further, $\delta\leq0.80$ allows the composite oxide to stabilize the crystalline structure. $\delta$ preferably satisfies $0.02\leq\delta\leq0.50$, more preferably satisfies $0.04\leq\delta\leq0.30$, and still more preferably satisfies $0.06\leq\delta\leq0.20$. It is to be noted that $\delta$ varies depending not only on the formulation ratio of $Me^1$ to $Me^2$ but also on the method for synthesizing the composite oxide.

Regarding the compositions for the respective elements in the formula (1), the composition for Li is a value measured by using inductively-coupled plasma-atomic emission spectroscopy, and each of the compositions for the other elements is a value measured by using inductively-coupled plasma-mass spectrometry. Here, each of the compositions for the respective elements in the formula (1) does not include an inorganic material used for the surface coating.

The composite oxide represented by the formula (1) has a layered rock-salt structure. The layered rock-salt structure of the composite oxide enables charge/discharges to be repeated stably. The presence/absence of a layered rock-salt structure can be determined by using X-ray diffraction analysis. It is not necessary that the whole of the composite oxide has a layered rock-salt structure, and at least a part of the composite oxide may only have a layered rock-salt structure.

In the lithium-iron-manganese-based composite oxide according to an exemplary embodiment, at least a part of the surface is coated with an oxide of at least one metal selected from the group consisting of La, Pr, Nd, Sm and Eu, or a composite oxide of at least one metal selected from the group consisting of La, Pr, Nd, Sm and Eu and at least one metal selected from the group consisting of Ge, Mo, Zr, Al and V. Since at least a part of the surface of the lithium-iron-manganese-based composite oxide is physically coated with the specific oxide or composite oxide, oxygen can be retained within the lithium-iron-manganese-based composite oxide even in charge/discharge cycles to suppress the detachment of oxygen to the outside. Further, coating with the specific oxide or composite oxide enables the suppression of the generation of a gas caused by the reaction with the electrolytic solution. The presence/absence of a coating with the specific oxide or composite oxide in at least a part of the surface of the lithium-iron-manganese-based composite oxide can be determined by using scanning electron microscopy (energy dispersive X-ray spectrometry), transmission electron microscopy, X-ray photoelectron spectroscopy, Auger electron spectroscopy, or electron energy loss spectroscopy.

For the oxide as a coating, an oxide of at least one metal selected from the group consisting of La, Pr, Nd, Sm and Eu (hereinafter, also referred to as oxide A) is used. Among them, La oxide and Sm oxide are preferred from the viewpoint of handleability and safety. Particularly, Sm oxide is more preferred from the viewpoint of suppressing the generation of a gas. One of them may be used singly, or two or more thereof may be used in combination.

A mixture of the oxide A and an oxide of at least one metal selected from the group consisting of Ge, Mo, Zr, Al and V (hereinafter, also referred to as oxide B) may be used for coating. Particularly, Ge oxide, Zr oxide, and Al oxide are preferred as the oxide B from the viewpoint of handleability and safety, and Ge oxide is more preferred from the viewpoint of suppressing the generation of a gas. One of them may be used singly, or two or more thereof may be used in combination. The mixing ratio between the oxide A and the oxide B (oxide A:oxide B) is preferably 1:0.5 to 1:2.0, and particularly preferably 1:1.

A composite oxide (hereinafter, also referred to as composite oxide A) of at least one metal selected from the group consisting of La, Pr, Nd, Sm and Eu (hereinafter, also referred to as metal A) and at least one metal selected from the group consisting of Ge, Mo, Zr, Al and V (hereinafter, also referred to as metal B) may be used as a coating. Particularly, as the composite oxide A, a composite oxide of at least one metal selected from the group consisting of La and Sm and at least one metal selected from the group consisting of Ge, Zr and Al are preferred from the viewpoint of handleability and safety, and a composite oxide of Sm and Ge are more preferred from the viewpoint of suppressing the generation of a gas. One of them may be used singly, or two or more thereof may be used in combination. The ratio between the metal A and the metal B in the composite oxide A (metal A:metal B) is preferably 1:0.5 to 1:2.0, and particularly preferably 1:1.

The content of the oxide A, the mixture of the oxide A and the oxide B, or the composite oxide A based on the lithium-iron-manganese-based composite oxide containing the oxide A, the mixture, or the composite oxide A (hereinafter, also referred to as amount of coating) is preferably 0.1% by mass or more and 15% by mass or less. When the amount of coating is 0.1% by mass or more, the detachment of oxygen to the outside can be sufficiently suppressed in charge/discharge cycles. Further, when the amount of coating is 15% by mass or less, the intercalation/deintercalation of Li is not inhibited. The amount of coating is more preferably 0.2% by mass or more and 10% by mass or less, still more preferably 0.5% by mass or more and 5% by mass or less, and particularly preferably 1% by mass or more and 3% by mass or less. If the amount of coating is increased, the capacity retention rate and the amount of gas to be generated can be improved, but the initial discharge capacity may be lowered. Thus the amount of coating is preferably 3% by mass or less.

The shape of the oxide A, the mixture of the oxide A and the oxide B, or the composite oxide A is not particularly limited as long as it is coating at least a part of the surface of the lithium-iron-manganese-based composite oxide, and may be layered or particulate.

[Method for Producing Lithium-iron-manganese-based Composite Oxide]

The method for producing the lithium-iron-manganese-based composite oxide according to an exemplary embodiment is not particularly limited as long as at least a part of the surface of the lithium-iron-manganese-based composite oxide having a layered rock-salt structure and satisfying the formula (1) is coated with the specific oxide or composite oxide. For example, a lithium-iron-manganese-based composite oxide having a layered rock-salt structure and satisfying the formula (1) and a hydrolyzable compound as a raw material for the specific oxide or composite oxide are mixed in a solution to react together, and thereafter heat-treated, and as a result at least a part of the surface of the lithium-iron-manganese-based composite oxide can be coated with the specific oxide or composite oxide. Specifically, examples of the method include the following methods.

The method for producing the lithium-iron-manganese-based composite oxide before being coated with the specific oxide or composite oxide is not particularly limited, and it can be produced by performing heat treatment such as calcination and hydrothermal treatment for a metal raw material at least containing lithium, manganese, iron and the like. On the other hand, in order to obtain a lithium-iron-manganese-based composite oxide more excellent in electrochemical properties, it is preferred to mix constituent metal elements other than lithium more homogeneously. From this viewpoint, for example, a method is preferred in which a composite hydroxide of iron, manganese and the like is obtained from a liquid phase and calcined together with a lithium compound. This method can be roughly divided into a step of production of a composite hydroxide to produce a composite hydroxide containing constituent metals other than lithium and a step of calcination to calcine the composite hydroxide under the coexistence of lithium.

<Step of Production of Composite Hydroxide>

The composite hydroxide can be made by adding water-soluble salts of its constituent metals to an alkaline aqueous solution dropwise to precipitate, performing air oxidation as necessary, and aging the hydroxide. The water-soluble salt of a constituent metal is not particularly limited, and examples thereof include an anhydrite and a hydrate of a nitrate, a sulfate, a chloride, an acetate or the like of a constituent metal. Likewise, the alkali source is not particularly limited, and examples thereof include lithium hydroxide and a hydrate thereof, sodium hydroxide, potassium hydroxide and an aqueous ammonia. One of these may be used singly, or two or more thereof may be used in combination. The composite hydroxide can be obtained by gradually adding water-soluble salts of its constituent metals to an alkaline aqueous solution dropwise over several hours. The temperature when adding water-soluble salts of the constituent metals is preferably 60° C. or lower from the viewpoint of suppressing the formation of an impurity such as spinel ferrite. In the case that water-soluble salts of the constituent metals are added dropwise at a temperature of 0° C. or lower, it is preferred to add ethanol or the like as an antifreeze to the alkaline aqueous solution to prevent the solidification of the solution. Preferably, the hydroxide obtained after the dropwise addition is aged by blowing an air therein at a room temperature for several hours or longer to wet-oxidize the hydroxide. The composite hydroxide desired can be obtained by washing the aged product with water and filtering the resultant.

<Step of Calcination>

To the composite hydroxide is added a predetermined lithium compound according to a compositional formula, and mixed together, and the resultant is then subjected to calcination in a predetermined atmosphere. Thereafter, washing with water, filtration and drying are performed as necessary for removing an excess of the lithium compound to provide a lithium-iron-manganese-based composite oxide having a desired compositional formula. The lithium compound is not particularly limited, and can be used an anhydride or a hydrate of lithium carbonate, lithium hydroxide, lithium nitrate, lithium acetate or the like. One of these may be used singly, or two or more thereof may be used in combination. The calcination temperature is preferably 1000° C. or lower from the viewpoint of preventing the volatilization of Li. The calcination atmosphere to be used can be an air atmosphere, an inert gas atmosphere, a nitrogen atmosphere, an oxygen atmosphere or the like. Through these steps, a lithium-iron-manganese-based composite oxide having a desired composition before being coated with an inorganic material can be made.

The source for an inorganic material for coating is preferably a chloride, a hydroxide, a carbonate, a nitrate, an acetate, an alcoholate or the like containing La, Pr, Nd, Sm, Eu, Ge, Mo, Zr, Al, V or the like. One of these may be used singly, or two or more thereof may be used in combination. Although the concentration of them in each of aqueous solutions or alcohol solutions is not particularly limited, the concentration is preferably 0.002 to 0.05% by mass. when the concentration is 0.002% by mass or more, the amount of time required for the evaporation of water or alcohol is reduced, which improves the production efficiency. Further, when the concentration is 0.05% by mass or less, the raw material is sufficiently dissolved to provide a homogeneous mixed solution.

After the evaporation of water or alcohol followed by drying, the resultant dry product can be calcined. Calcination can be performed in vacuum, in an air atmosphere, in an inert atmosphere, in hydrogen, in nitrogen, or in a mixed atmosphere of them. Calcination is preferably performed in an air atmosphere from the viewpoint of cost reduction. The calcination temperature is preferably 350 to 800° C. When the calcination temperature is 350° C. or higher, the reaction is completed and an impurity or the like in the reaction does not remain. Further, when the calcination temperature is 800° C. or lower, the reaction with the lithium in the lithium-iron-manganese-based composite oxide is suppressed, and as a result the contamination of a lithium compound as an impurity can be prevented. The method for drying is not particularly limited, and examples thereof include, in addition to a conventional method for drying, a method for drying using a rotary evaporator, a spray dryer or the like.

[Positive Electrode Active Material for Lithium-ion Secondary Battery]

A positive electrode active material for a lithium-ion secondary battery according to an exemplary embodiment contains the lithium-iron-manganese-based composite oxide according to an exemplary embodiment. When the positive electrode active material contains the lithium-iron-manganese-based composite oxide according to an exemplary embodiment, the detachment of oxygen is suppressed even in charge/discharge cycles and the capacity of the secondary battery is retained.

The content of the lithium-iron-manganese-based composite oxide according to an exemplary embodiment in the positive electrode active material for a lithium-ion secondary battery according to an exemplary embodiment is preferably 80% by mass or more, more preferably 90% by mass or more, and still more preferably 95% by mass or more. It is to be noted that the content may be 100% by mass, that is, the positive electrode active material for a lithium-ion secondary battery according to an exemplary embodiment may consist of the lithium-iron-manganese-based composite oxide according to an exemplary embodiment.

[Positive Electrode for Lithium-ion Secondary Battery]

A positive electrode for a lithium-ion secondary battery according to an exemplary embodiment (hereinafter, also referred to as positive electrode) contains the positive electrode active material for a lithium-ion secondary battery according to an exemplary embodiment.

The positive electrode can be made by applying the positive electrode active material according to an exemplary embodiment onto a positive electrode current collector. For example, the positive electrode can be made by mixing the positive electrode active material according to an exemplary embodiment, a conductivity-imparting agent, a binder and a solvent together, coating a positive electrode current collector with the mixture, and drying the resultant. The conductivity-imparting agent to be used can be a carbon material such as Ketjen black, a metal material such as Al, a conductive oxide or the like. The binder to be used can be a polyvinylidene fluoride, an acrylic resin, a polytetrafluoroethylene resin or the like. The solvent to be used can be N-methylpyrrolidone or the like. The positive electrode current collector to be used can be a metal thin film primarily containing aluminum or the like. Although the thickness of the positive electrode current collector is not particularly limited, for example, it can be set to 5 to 50 μm.

The amount of the conductivity-imparting agent to be added can be 1 to 10% by mass, and is preferably 2 to 7% by mass. When the amount to be added is 1% by mass or more, a sufficient conductivity can be maintained. Further, when the amount to be added is 10% by mass or less, the mass fraction of the positive electrode active material can be increased, and hence the capacity per mass can be increased. The amount of the binder to be added can be 1 to 10% by mass, and is preferably 2 to 7% by mass. When the amount to be added is 1% by mass or more, the peel-off of the positive electrode can be prevented. Further, when the amount to be added is 10% by mass or less, the mass fraction of the positive electrode active material can be increased, and hence the capacity per mass can be increased.

Although the thickness of the positive electrode is not particularly limited, for example, it can be set to 50 to 500 μm, and is preferably 100 to 400 μm.

[Lithium-ion Secondary Battery]

A lithium-ion secondary battery according to an exemplary embodiment includes the positive electrode for a lithium-ion secondary battery according to an exemplary embodiment and a negative electrode.

One example of the secondary battery according to an exemplary embodiment is shown in FIG. 1. In the secondary battery shown in FIG. 1, a positive electrode active material layer 1 containing the positive electrode active material according to an exemplary embodiment is formed on a positive electrode current collector 1A to configure a positive electrode. Further, a negative electrode active material layer 2 is formed on a negative electrode current collector 2A to configure a negative electrode. These positive electrode and negative electrode, being soaked in an electrolytic solution, are oppositely disposed with a separator 3 sandwiched therebetween and laminated. Further, the positive electrode and the negative electrode are connected to a positive electrode tab 1B and a negative electrode tab 2B, respectively. This power-generating element is contained in an outer package 4 with the positive electrode tab 1B and the negative electrode tab 2B exposed to the outside.

By applying a voltage to the positive electrode and the negative electrode, a lithium ion is detached from the positive electrode active material and the lithium ion is intercalated in the negative electrode active material, which results in charging. Alternatively, by electrically contacting the positive electrode with the negative electrode in the outside of the secondary battery, contrary to the case of charging, a lithium ion is deintercalated from the negative electrode active material and the lithium ion is intercalated in the positive electrode active material, which results in discharging.

The electrolytic solution to be used for the secondary battery according to an exemplary embodiment can be a solution obtained by dissolving a lithium salt as a supporting electrolyte in a solvent. The solvent to be used can be a cyclic carbonate such as ethylene carbonate (EC), propylene carbonate (PC), butylene carbonate (BC) and vinylene carbonate (VC); a chain carbonate such as dimethyl carbonate (DMC), ethyl methyl carbonate (EMC), diethyl carbonate (DEC) and dipropyl carbonate (DPC); an aliphatic carboxylate such as methyl formate, methyl acetate and ethyl propionate; a γ-lactone such as γ-butyrolactone; a chain ether such as 1,2-diethoxyethane (DEE) and ethoxymethoxyethane (EME); a cyclic ether such as tetrahydrofuran and 2-methyltetrahydrofuran; an aprotic organic solvent such as dimethyl sulfoxide, 1,3-dioxolane, formamide, acetamide, dimethylformamide, dioxolane, acetonitrile, propylnitrile, nitromethane, ethyl monoglyme, a phosphoric triester, trimethoxymethane, a dioxolane derivative, sulfolane, methylsulfolane, 1,3-dimethyl-2-imidazolidinone, 3-methyl-2-oxazolidinone, a propylene carbonate derivative, a tetrahydrofuran derivative, ethyl ether, 1,3-propanesultone, anisole, N-methylpyrrolidone and a fluorinated carboxylate, or the like. One of these may be used singly, or two or more thereof may be used in combination. Among them, a mixed solution of a cyclic carbonate and a chain carbonate is preferably used as the solvent from the viewpoint of stability at a high voltage and the viscosity of the solvent.

Examples of the lithium salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$, $LiN(C_2F_5SO_2)_2$, $LiB_{10}Cl_{10}$, lithium salts of lower aliphatic carboxylic acids, chloroborane lithium, lithium tetraphenylborate, LiBr, LiI, LiSCN, LiCl and imides. One of these may be used singly, or two or more thereof may be used in combination.

The concentration of the lithium salt as the supporting electrolyte can be, for example, 0.5 to 3.0 mol/L, and is preferably 0.7 to 2.0 mol/L. When the concentration of the lithium salt is 0.5 mol/L or more, a sufficient electrical conductivity can be obtained. Further, when the concentration of the lithium salt is 3.0 mol/L or less, the increase of the density and viscosity can be suppressed.

Alternatively, a polymer electrolyte may be used which is obtained by adding a polymer or the like to a solvent for an electrolytic solution to solidify the electrolytic solution into a gel.

The negative electrode active material to be used can be a material capable of intercalating/deintercalating lithium. The negative electrode active material to be used can be, for example, a carbon material such as graphite, hard carbon, soft carbon and amorphous carbon; metal lithium, Si, Sn and Al; an Si oxide such as SiO; an Sn oxide; $Li_4Ti_5O_{12}$; a Ti oxide such as $TiO_2$; and a V-containing oxide, an Sb-containing oxide, an Fe-containing oxide and a Co-containing oxide. One of these negative electrode active materials may be used singly, or two or more thereof may be used in combination. Particularly for the secondary battery according to an exemplary embodiment, the negative electrode active material to be used is preferably SiO from the viewpoint that the irreversible capacity is canceled in association with the positive electrode active material according to an exemplary embodiment.

The negative electrode can be made, for example, by mixing the negative electrode active material, a conductivity-imparting agent, a binder and a solvent together, coating a negative electrode current collector with the mixture, and drying the resultant. The conductivity-imparting agent to be used can be, for example, a carbon material, a conductive oxide or the like. The binder to be used can be a polyvinylidene fluoride, an acrylic resin, a styrene-butadiene rubber, an imide-based resin, an imide-amide-based resin, a polytetrafluoroethylene resin, a polyamic acid or the like. The solvent to be used can be N-methylpyrrolidone or the like. The negative electrode current collector to be used can be a metal thin film primarily containing aluminum, copper or the like. Although the thickness of the negative electrode current collector is not particularly limited, for example, it can be set to 5 to 50 μm, and is preferably 10 to 40 μm. Further, although the thickness of the negative electrode is not particularly limited, for example, it can be set to 10 to 100 μm, and is preferably 20 to 70 μm.

The secondary battery according to an exemplary embodiment can be produced by assembling using the positive electrode according to an exemplary embodiment. For example, the positive electrode according to an exemplary embodiment and a negative electrode are oppositely disposed with a separator sandwiched therebetween without being electrically contacted in an atmosphere of a dry air or an inert gas. The separator to be used can be a porous film containing a polyethylene, a polypropylene (PP), a polyimide, a polyamide or the like.

The assemblage of the positive electrode and the negative electrode oppositely disposed with the separator sandwiched therebetween is configured in a cylindrical or laminated form and contained in an outer package. The outer package to be used can be a battery can, a laminated film, which is a laminate of a synthetic resin and a metal foil, or the like. The positive electrode and the negative electrode are connected to a positive electrode tab and a negative electrode tab, respectively, in a manner such that these electrode tabs are exposed to the outside of the outer package. The outer package is sealed with a part thereof unsealed, from which an electrolytic solution is injected, and then the outer package is completely sealed to provide a secondary battery. Further, activation treatment may be performed for the secondary battery before use.

The shape of the assemblage of the positive electrode and the negative electrode oppositely disposed with the separator sandwiched therebetween is not particularly limited, and can be a wound shape, a laminated shape or the like. The type of the secondary battery can be a coin type, a laminated type or the like. The shape of the secondary battery can be a rectangular shape, a cylindrical shape or the like.

EXAMPLES

Hereinafter, Examples of exemplary embodiments are illustrated, but exemplary embodiments are not limited to these Examples.

Example 1

<Synthesis of Lithium-iron-manganese-based Composite Oxide>

Iron (III) nitrate, manganese (II) chloride and nickel (II) nitrate which had been weighed so as to achieve a predetermined atom ratio were dissolved in distilled water to make an aqueous solution of metal salts (total amount: 0.25 mol/batch). Separately, 1.25 mol/L of an aqueous lithium hydroxide solution was prepared, to which ethanol was added to make the solution non-freezable, and thereafter the resultant was cooled to −10° C. in a thermostatic chamber. To this alkaline solution, the aqueous solution of metal salts was gradually added dropwise over 2 hours or longer to make a composite hydroxide. The alkaline solution containing a composite hydroxide after the dropwise addition was removed from the thermostatic chamber, an air was blown into the solution to wet-oxidize for 2 days, and thereafter the composite hydroxide was aged at a room temperature.

After the composite hydroxide after aging was washed with water and filtered out, lithium carbonate in a molar amount equivalent to the molar amount charged was added thereto, and calcined in the atmosphere at 850° C. for 5 hours. After the calcination, the product was milled, washed several times with distilled water, and thereafter filtered out and dried at 100° C. to afford the lithium-iron-manganese-based composite oxide $Li_{1.20}Mn_{0.47}Ni_{0.16}Fe_{0.16}O_{1.89}$.

In 10 mL of water was dissolved 0.2 g of samarium nitrate. The obtained solution was applied by spraying onto 20 g of the synthesized lithium-iron-manganese-based composite oxide before being coated. The obtained slurry mixture was dried in an air thermostatic chamber at 120° C. overnight. The powder was heat-treated in an air atmosphere at 400° C. for 3 hours to afford a composite oxide in which a part of the surface of the lithium-iron-manganese-based composite oxide was coated with Sm oxide. Further, it was confirmed from the diffraction pattern in an X-ray diffraction measurement (XRD) that this substance had a layered rock-salt structure. In addition, no peak shift caused by the coating of Sm oxide was observed and hence the structure of the lithium-iron-manganese-based composite oxide as the base material was nearly unchanged. From the SEM images (scanning electron microscopy image) and results of EDX (energy dispersive X-ray spectrometry) analyses, it was found that not the entire surface but a part of the surface of the lithium-iron-manganese-based composite oxide was coated with Sm oxide. The content (amount of coating) of Sm oxide based on the whole of the lithium-iron-manganese-based composite oxide was 1% by mass.

<Making of Positive Electrode>

A mixture containing 92% by mass of the lithium-iron-manganese-based composite oxide as a positive electrode active material in which a part of the surface of the lithium-iron-manganese-based composite oxide $Li_{1.20}Mn_{0.47}Ni_{0.16}Fe_{0.16}O_{1.89}$ was coated with Sm oxide, 4% by mass of Ketjen black and 4% by mass of a polyvinylidene fluoride was mixed in a solvent to prepare a slurry. The slurry was applied onto a positive electrode current collector of an aluminum foil with a thickness of 20 μm, and the slurry was dried to provide a positive electrode with a thickness of 175 μm.

<Making of Negative Electrode>

A mixture containing 85% by mass of SiO with an average particle diameter of 15 μm and 15% by mass of a polyamic acid was mixed in a solvent to prepare a slurry. The slurry was applied onto a negative electrode current collector of a cupper foil with a thickness of 10 μm, and the slurry was dried to provide a negative electrode with a thickness of 46 μm. The negative electrode provided was annealed in a nitrogen atmosphere at 350° C. for 3 hours to cure the polyamic acid.

<Making of Lithium-ion Secondary Battery>

After the positive electrode and the negative electrode were shaped, they were laminated together with a porous film separator sandwiched therebetween. Thereafter, a positive electrode tab and a negative electrode tab were welded to the positive electrode and the negative electrode, respectively, to make a power-generating element. The power-generating element was covered with an outer package of an aluminum laminated film, and 3 sides of the outer package were sealed by using heat fusion. Thereafter, an EC/DEC electrolytic solution containing 1 mol/L of $LiPF_6$ was injected into the outer package at a moderate degree of vacuum. Then, the unsealed one side of the outer package was sealed under a reduced pressure by using heat fusion to make a lithium-ion secondary battery before activation treatment.

<Activation Treatment>

The lithium-ion secondary battery before activation treatment was subjected to two charge/discharge cycles in each of which charging was performed to 4.5 V at a current of 20 mA per gram of the positive electrode active material and then discharging was performed to 1.5 V at a current of 20 mA per gram of the positive electrode active material. Thereafter, the sealed portion of the outer package was temporarily opened, the pressure was reduced to remove a gas in the secondary battery, and the opened portion was resealed to make a lithium-ion secondary battery.

<Evaluation of Lithium-ion Secondary Battery>

The lithium-ion secondary battery was charged to 4.5 V at a constant current of 40 mA per gram of the positive electrode active material and further charged to a current of 5 mA/g at a constant voltage of 4.5 V in a thermostatic chamber at 45° C. Then, the lithium-ion secondary battery was discharged to 1.5 V at a current of 10 mA/g. The lithium-ion secondary battery was subjected to 40 charge/discharge cycles in each of which charging was performed to 4.5 V at a constant current of 40 mA per gram of the positive electrode active material, charging was further performed to a current of 5 mA/g at a constant voltage of 4.5 V, and thereafter discharging was performed to 1.5 V at a current of 40 mA/g in a thermostatic chamber at 45° C. The capacity retention rate after 40 cycles was determined from the ratio of the discharge capacity obtained at the 40th cycle to that obtained at the first cycle. The initial discharge capacity after the activation treatment in Example 1 was 250 mAh/g, and the capacity retention rate after 40 cycles was 90%. The amount of gas generated after 40 cycles was 4 mL/g. For evaluation of the amount of gas generated, the change in volume of the cell after cycles was measured by using the Archimedes method. The result is shown in Table 1.

Example 2

A composite oxide in which a part of the surface of the lithium-iron-manganese-based composite oxide was coated with La oxide was synthesized in the same way as in Example 1 except that lanthanum nitrate was used as a raw material in place of samarium nitrate. It was confirmed from the X-ray diffraction measurement and EDX analysis as described in Example 1 that the composite oxide was a composite oxide having a layered rock-salt structure in which a part of the surface was coated with La oxide. The amount of coating with La oxide was 1% by mass. A lithium-ion secondary battery was made by using the composite oxide and evaluated in the same way as in Example 1. The result is shown in Table 1.

Example 3

A composite oxide in which a part of the surface of the lithium-iron-manganese-based composite oxide was coated with Pr oxide was synthesized in the same way as in Example 1 except that praseodymium nitrate was used as a raw material in place of samarium nitrate. It was confirmed from the X-ray diffraction measurement and EDX analysis as described in Example 1 that the composite oxide was a composite oxide having a layered rock-salt structure in which a part of the surface was coated with Pr oxide. The amount of coating with Pr oxide was 1% by mass. A lithium-ion secondary battery was made by using the composite oxide and evaluated in the same way as in Example 1. The result is shown in Table 1.

Example 4

A composite oxide in which a part of the surface of the lithium-iron-manganese-based composite oxide was coated with Eu oxide was synthesized in the same way as in Example 1 except that europium nitrate was used as a raw material in place of samarium nitrate. It was confirmed from the X-ray diffraction measurement and EDX analysis as described in Example 1 that the composite oxide was a composite oxide having a layered rock-salt structure in which a part of the surface was coated with Eu oxide. The amount of coating with Eu oxide was 1% by mass. A lithium-ion secondary battery was made by using the composite oxide and evaluated in the same way as in Example 1. The result is shown in Table 1.

Example 5

A composite oxide in which a part of the surface of the lithium-iron-manganese-based composite oxide was coated with Nd oxide was synthesized in the same way as in Example 1 except that neodymium nitrate was used as a raw material in place of samarium nitrate. It was confirmed from the X-ray diffraction measurement and EDX analysis as described in Example 1 that the composite oxide was a composite oxide having a layered rock-salt structure in which a part of the surface was coated with Nd oxide. The amount of coating with Nd oxide was 1% by mass. A lithium-ion secondary battery was made by using the composite oxide and evaluated in the same way as in Example 1. The result is shown in Table 1.

Example 6

A composite oxide in which a part of the surface of the lithium-iron-manganese-based composite oxide was coated with Sm oxide was synthesized in the same manner as in Example 1 except that a solution obtained by dissolving 1.0 g of samarium nitrate in 10 mL of water was applied by spraying onto 20 g of the synthesized lithium-iron-manganese-based composite oxide before being coated. It was confirmed from the X-ray diffraction measurement and EDX analysis as described in Example 1 that the composite oxide was a composite oxide having a layered rock-salt structure in which a part of the surface was coated with Sm oxide. The amount of coating with Sm was 5% by mass. A lithium-ion secondary battery was made by using the composite oxide and evaluated in the same way as in Example 1. The result is shown in Table 1.

Example 7

In 10 mL of water was dissolved 0.2 g of germanium oxide and 0.048 g of lithium hydroxide. The obtained solution was applied by spraying onto 20 g of the lithium-iron-manganese-based composite oxide before being coated which had been synthesized in Example 1. The obtained slurry mixture was dried in an air thermostatic chamber at 110° C. overnight. The powder was heat-treated in an air atmosphere at 400° C. for 3 hours to afford a composite oxide in which a part of the surface of the lithium-iron-manganese-based composite oxide was coated with Ge oxide. A solution obtained by dissolving 0.2 g of samarium nitrate in 10 mL of water was applied by spraying onto 20 g of the lithium-iron-manganese-based composite oxide coated with Ge oxide. The obtained slurry mixture was dried in an air thermostatic chamber at 120° C. overnight. The powder was heat-treated in an air atmosphere at 400° C. for 3 hours to afford a composite oxide in which a part of the surface of the lithium-iron-manganese-based composite oxide was coated with Ge oxide and Sm oxide. Further, it was confirmed from the diffraction pattern in an X-ray diffraction measurement (XRD) that this substance had a layered rock-salt structure. In addition, no peak shift caused by the coating was observed and hence the structure of the lithium-iron-manganese-based composite oxide as the base material was nearly unchanged. From the SEM images and results of EDX analyses, it was found that not the entire surface but a part of the surface of the lithium-iron-manganese-based composite oxide was coated with Ge oxide and Sm oxide. The amount of coating with Ge oxide and Sm oxide was 2% by mass. A lithium-ion secondary battery was made by using the composite oxide and evaluated in the same way as in Example 1. The result is shown in Table 1.

Example 8

A composite oxide in which a part of the surface of the lithium-iron-manganese-based composite oxide was coated with Eu oxide and Ge oxide was synthesized in the same way as in Example 7 except that europium nitrate was used as a raw material in place of samarium nitrate. It was confirmed from the X-ray diffraction measurement and EDX analysis as described in Example 7 that the composite oxide was a composite oxide having a layered rock-salt structure in which a part of the surface was coated with Eu oxide and Ge oxide. The amount of coating with Eu oxide and Ge oxide was 2% by mass. A lithium-ion secondary battery was made by using the composite oxide and evaluated in the same way as in Example 1. The result is shown in Table 1.

Example 9

A solution obtained by dissolving 0.2 g of samarium nitrate and 0.2 g of zirconium nitrate in 20 mL of water was applied by spraying onto 20 g of the lithium-iron-manganese-based composite oxide before being coated which had been synthesized in Example 1. The obtained slurry mixture was dried in an air thermostatic chamber at 120° C. overnight. The powder was heat-treated in an air atmosphere at 400° C. for 3 hours to afford a composite oxide in which a part of the surface of the lithium-iron-manganese-based composite oxide was coated with Sm oxide and Zr oxide. It was confirmed from the X-ray diffraction measurement and EDX analysis as described in Example 7 that the composite oxide was a composite oxide having a layered rock-salt structure in which a part of the surface was coated with Sm oxide and Zr oxide. The amount of coating with Sm oxide and Zr oxide was 2% by mass. A lithium-ion secondary battery was made by using the composite oxide and evaluated in the same way as in Example 1. The result is shown in Table 1.

Example 10

In 25 mL of water was dissolved 0.5 g of germanium oxide and 0.12 g of lithium hydroxide. The obtained solution was applied by spraying onto 20 g of the lithium-iron-manganese-based composite oxide before being coated which had been synthesized in Example 1. The obtained slurry mixture was dried in an air thermostatic chamber at 110° C. overnight. The powder was heat-treated in an air atmosphere at 400° C. for 3 hours to afford a composite oxide in which a part of the surface of the lithium-iron-manganese-based composite oxide was coated with Ge oxide. A solution obtained by dissolving 0.5 g of samarium nitrate in 25 mL of water was applied by spraying onto 20 g of the lithium-iron-manganese-based composite oxide coated with Ge oxide. The obtained slurry mixture was dried in an air thermostatic chamber at 120° C. overnight. The powder was heat-treated in an air atmosphere at 400° C. for 3 hours to afford a composite oxide in which a part of the surface of the lithium-iron-manganese-based composite oxide was coated with Ge oxide and Sm oxide. Further, it was confirmed from the diffraction pattern in an X-ray diffraction measurement (XRD) that this substance had a layered rock-salt structure. In addition, no peak shift caused by the coating was observed and hence the structure of the lithium-iron-manganese-based composite oxide as the base material was nearly unchanged. From the SEM images and results of EDX analyses, it was found that not the entire surface but a part of the surface of the lithium-iron-manganese-based composite oxide was coated with Ge oxide and Sm oxide. The amount of coating with Ge oxide and Sm oxide was 5% by mass. A lithium-ion secondary battery was made by using the composite oxide and evaluated in the same way as in Example 1. The result is shown in Table 1.

Example 11

A lithium-ion secondary battery was made and evaluated in the same way as in Example 1 except that $Li_{1.26}Mn_{0.52}Ni_{0.11}Fe_{0.11}O_2$ was made by using a different initial composition and coated with Sm oxide. The initial discharge capacity after the activation treatment was 260 mAh/g. The result is shown in Table 1.

Example 12

A lithium-ion secondary battery was made and evaluated in the same way as in Example 6 except that $Li_{0.26}Mn_{0.52}Ni_{0.11}Fe_{0.11}O_2$ was made by using a different initial composition and coated with Sm oxide. The initial discharge capacity after the activation treatment was 258 mAh/g. The result is shown in Table 1.

Example 13

A lithium-ion secondary battery was made and evaluated in the same way as in Example 7 except that $Li_{0.26}Mn_{0.52}Ni_{0.11}Fe_{0.11}O_2$ was made by using a different initial composition and coated with Ge oxide and Sm oxide. The initial discharge capacity after the activation treatment was 260 mAh/g. The result is shown in Table 1.

Example 14

A lithium-ion secondary battery was made and evaluated in the same way as in Example 10 except that $Li_{0.26}Mn_{0.52}Ni_{0.11}Fe_{0.11}O_2$ was made by using a different initial composition and coated with Ge oxide and Sm oxide. The initial discharge capacity after the activation treatment was 258 mAh/g. The result is shown in Table 1.

Example 15

A solution obtained by dissolving 0.5 g of samarium nitrate and 1.0 g of aluminum nitrate in 20 mL of water was applied by spraying onto 20 g of the lithium-iron-manganese-based composite oxide $Li_{1.26}Mn_{0.52}Ni_{0.11}Fe_{0.11}O_2$ before being coated which had been synthesized in Examples 11 to 14. The obtained slurry mixture was dried in an air thermostatic chamber at 120° C. overnight. The powder was heat-treated in an air atmosphere at 400° C. for 3 hours to afford a composite oxide in which a part of the surface of the lithium-iron-manganese-based composite oxide was coated with Sm oxide and Al oxide. It was confirmed from the X-ray diffraction measurement and EDX analysis as described in Example 7 that the composite oxide was a composite oxide having a layered rock-salt structure in which a part of the surface was coated with Sm oxide and Al oxide. The amount of coating with Sm oxide and Al oxide was 5% by mass. A lithium-ion secondary battery was made by using the composite oxide and evaluated in the same way as in Example 1. The result is shown in Table 1.

Comparative Example 1

A lithium-ion secondary battery was made and evaluated in the same way as in Example 1 except that the lithium-iron-manganese-based composite oxide $Li_{1.19}Mn_{0.47}Ni_{0.16}Fe_{0.17}O_{1.99}$ the surface of which was not coated was used as a positive electrode active material. In this Comparative Example 1, the initial discharge capacity after the activation was 250 mAh/g, and the capacity retention rate after 40 cycles was 87%. The amount of gas generated after 40 cycles was 8 mL/g.

Comparative Example 2

A lithium-ion secondary battery was made and evaluated in the same way as in Example 1 except that the lithiumiron-manganese-based composite oxide $Li_{1.26}Mn_{0.52}Ni_{0.11}Fe_{0.11}O_2$ the surface of which was not coated was used as a positive electrode active material. In this Comparative Example 2, the initial discharge capacity after the activation was 260 mAh/g. The result is shown in Table 1.

TABLE 1

| | Coating | Amount of coating (% by mass) | Capacity retention rate (%) | Amount of gas generated (mL/g) |
|---|---|---|---|---|
| Example 1 | Sm oxide | 1 | 90 | 4 |
| Example 2 | La oxide | 1 | 90 | 5 |
| Example 3 | Pr oxide | 1 | 90 | 5 |
| Example 4 | Eu oxide | 1 | 89 | 6 |
| Example 5 | Nd oxide | 1 | 89 | 7 |
| Example 6 | Sm oxide | 5 | 90 | 3 |
| Example 7 | Sm oxide/Ge oxide | 2 | 91 | 2 |
| Example 8 | Eu oxide/Ge oxide | 2 | 91 | 3 |
| Example 9 | Sm oxide/Zr oxide | 2 | 90 | 3 |
| Example 10 | Sm oxide/Ge oxide | 5 | 91 | 2 |
| Example 11 | Sm oxide | 1 | 90 | 3 |
| Example 12 | Sm oxide | 5 | 91 | 1 |
| Example 13 | Sm oxide/Ge oxide | 2 | 89 | 4 |
| Example 14 | Sm oxide/Ge oxide | 5 | 90 | 2 |
| Example 15 | Sm oxide/Al oxide | 5 | 90 | 1 |
| Comparative Example 1 | — | — | 87 | 8 |
| Comparative Example 2 | — | — | 87 | 10 |

It was found that the coating with the oxide or composite oxide according to an exemplary embodiment was able not only to suppress capacity reduction in cycles, but also to reduce the amount of gas to be generated per gram of the positive electrode active material. Each of the coatings obtained in Examples 7 to 10 and 13 to 15 is present as a mixture of two types of oxides for most part. However, a part of the coating is expected to be present as a composite oxide formed through complexing.

This application claims the priority to Japanese Patent Application No. 2015-31704 filed on Feb. 20, 2015, the content of which is entirely incorporated herein.

Hereinbefore, the invention of the present application has been illustrated referring to exemplary embodiments and Examples, but the invention of the present application is not limited to the above exemplary embodiments and Examples. For the configuration and details of the invention of the present application, various modifications can be made that those skilled in the art can appreciate within the scope of the invention of the present application.

INDUSTRIAL APPLICABILITY

The lithium-ion secondary battery according to an exemplary embodiment has a high energy density and is also excellent in cycle characteristics, and accordingly can be widely utilized for an electronic device, an electrical vehicle, a battery for storing electrical power for general household or facilities, or the like.

REFERENCE SIGNS LIST

1 positive electrode active material layer
1A positive electrode current collector
1B positive electrode tab
2 negative electrode active material layer
2A negative electrode current collector
2B negative electrode tab
3 separator
4 outer package

The invention claimed is:

1. A lithium-iron-manganese-based composite oxide having a layered rock-salt structure, wherein at least a part of a surface of the lithium-iron-manganese-based composite oxide represented by the following formula (1) is coated with a mixture of an oxide A of at least one metal selected from the group consisting of La, Pr, Nd, Sm and Eu and an oxide B of at least one metal selected from the group consisting of Ge, Mo, Zr, Al and V:

$$Li_xM^1_{(y-p)}Mn_pM^2_{(z-q)}Fe_qO_{(2-\delta)} \quad (1)$$

wherein $1.05 \leq x \leq 1.32$, $0.33 \leq y \leq 0.63$, $0.06 \leq z \leq 0.50$, $0 < \leq p \leq 0.63$, $0.06 \leq q \leq 0.50$, $0 \leq \delta \leq 0.80$, $y \geq p$, and $z \geq q$; $M^1$ is at least one element selected from the group consisting of Ti and Zr; and $M^2$ is at least one element selected from the group consisting of Co, Ni wherein, in the formula (1), q satisfies $0.16 \leq q \leq 0.45$, and wherein a mixing ratio between the oxide A and the oxide B (oxide A : oxide B) is 1:0.5 to 1:2.0.

2. A positive electrode active material for a lithium-ion secondary battery, wherein the positive electrode active material comprises the lithium-iron-manganese-based composite oxide according to claim 1.

3. A positive electrode for a lithium-ion secondary battery, wherein the positive electrode comprises the positive electrode active material according to claim 2.

4. A lithium-ion secondary battery comprising the positive electrode according to claim 3 and a negative electrode.

5. The lithium-ion secondary battery according to claim 4, wherein the negative electrode comprises SiO as a negative electrode active material.

6. The lithium-ion secondary battery according to claim 4, wherein in the formula (1), $\delta$ satisfies $0 \leq \delta \leq 0.50$.

7. The lithium-ion secondary battery according to claim 4, wherein in the formula (1), $\delta = 0$.

8. The lithium-iron-manganese-based composite oxide according to claim 1, wherein a content of the coated mixture is 1% by mass or more and 15% by mass or less.

9. The lithium-iron-manganese-based composite oxide according to claim 1, wherein, in the formula (1), $\delta$ satisfies $0 \leq \delta \leq 0.50$.

10. The lithium-iron-manganese-based composite oxide according to claim 1, wherein, in the formula (1), $\delta = 0$.

11. A lithium-ion secondary battery comprising a positive electrode and a negative electrode,
wherein the positive electrode comprises a positive electrode active material comprising a lithium-iron-manganese-based composite oxide represented by the following formula (1):

$$Li_xM^1_{(y-p)}Mn_pM^2_{(z-q)}Fe_qO_{(2-\delta)} \quad (1)$$

wherein $1.05 \leq x \leq 1.32$, $0.33 \leq y \leq 0.63$, $0.06 \leq z \leq 0.50$, $0 < \leq p \leq 0.63$, $0.06 \leq q \leq 0.50$, $0 \leq \delta \leq 0.80$, $y \geq p$, and $z \geq q$; $M^1$ is at least one element selected from the group consisting of Ti and Zr; and $M^2$ is at least one element selected from the group consisting of Co, Ni at least a part of a surface of the lithium-iron-manganese-based composite oxide is coated with a mixture of an oxide A of at least one metal selected from the group consisting of La, Pr, Nd, Sm and Eu and an oxide B of at least one metal selected from the group consisting of Ge, Mo, Zr, Al and V;

a mixing ratio between the oxide A and the oxide B (oxide A : oxide B) is 1:0.5 to 1:2.0;

wherein a content of the coated mixture is 1% by mass or more and 15% by mass or less; and the negative electrode comprises SiO as a negative electrode active material.

12. The lithium-ion secondary battery according to claim 11, wherein in the formula (1), $\delta$ satisfies $0 \leq \delta \leq 0.50$.

13. The lithium-ion secondary battery according to claim 11, wherein in the formula (1), $\delta=0$.

* * * * *